US012754463B2

(12) United States Patent

Uema et al.

(10) Patent No.: US 12,754,463 B2

(45) Date of Patent: Oct. 6, 2026

(54) PIXEL SHIFTING DEVICE AND PROJECTOR

(71) Applicant: SEIKO EPSON CORPORATION, Tokyo (JP)

(72) Inventors: Takato Uema, Azumino (JP); Tatsuya Takahashi, Azumino (JP); Masatoshi Ito, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 231 days.

(21) Appl. No.: 18/393,912

(22) Filed: Dec. 22, 2023

(65) Prior Publication Data

US 2024/0210802 A1 Jun. 27, 2024

(30) Foreign Application Priority Data

Dec. 23, 2022 (JP) ................................ 2022-206384

(51) Int. Cl.
*G03B 21/14* (2006.01)

(52) U.S. Cl.
CPC ................................ *G03B 21/142* (2013.01)

(58) Field of Classification Search
CPC .................................................. G03B 21/142
USPC .......................................................... 353/97
See application file for complete search history.

(56) References Cited

U.S. PATENT DOCUMENTS

2018/0146179 A1 5/2018 Ohno
2019/0346684 A1* 11/2019 Chou ................ G02B 27/0977
2020/0174246 A1* 6/2020 Wakabayashi ....... G03B 21/006
2021/0294094 A1 9/2021 Wakabayashi et al.
2022/0132084 A1 4/2022 Yanagisawa et al.
2022/0163756 A1 5/2022 Wakabayashi et al.
2022/0163829 A1 5/2022 Wakabayashi et al.
2024/0210802 A1 6/2024 Uema et al.

FOREIGN PATENT DOCUMENTS

JP 2014174419 A * 9/2014
JP 2020-091343 A 6/2020
JP 2021124544 A * 8/2021
JP 2021148890 A 9/2021

OTHER PUBLICATIONS

Translation of JP_2014174419_A (Year: 2025).*
Translation of JP_2021124544_A (Year: 2025).*

* cited by examiner

*Primary Examiner* — Jerry L Brooks
(74) *Attorney, Agent, or Firm* — Dority & Manning, P.A

(57) ABSTRACT

A pixel shifting device includes a first frame which holds an optical member, and which oscillates around a first oscillation axis, a second frame oscillating around a second oscillation axis, a base to be coupled to the second frame via a first coupling part, a pair of first oscillation shaft formation parts for coupling the first frame and the second frame, a first actuator for oscillating the first frame, and a second actuator for oscillating the second frame, wherein the second frame and the base have an extending part which extends along the second oscillation axis, and in which the second actuator is disposed, and the pair of first oscillation shaft formation parts have a pair of second coupling parts for coupling the first and second frames, and a pair of beams extending on the second frame respectively from the pair of second coupling parts along the second oscillation axis.

12 Claims, 6 Drawing Sheets

PIXEL SHIFTING DEVICE AND PROJECTOR

The present application is based on, and claims priority from JP Application Serial Number 2022-206384, filed Dec. 23, 2022, the disclosure of which is hereby incorporated by reference herein in its entirety.

BACKGROUND

1. Technical Field

The present disclosure relates to a pixel shifting device and a projector.

2. Related Art

In the past, there has been a projector equipped with a pixel shifting device for shifting a light path of image light emitted from a light modulation device such as a liquid crystal panel (see, e.g., JP-A-2020-91343).

The pixel shifting device in the projector described above is provided with a first frame for holding an optical member, a second frame which is disposed around the first frame to couple the first frame, a base member which is disposed around the second frame to couple the second frame, a first actuator for oscillating the first frame around a first oscillation axis with respect to the second frame, and a second actuator for oscillating the second frame around a second oscillation axis with respect to the base member.

In the pixel shifting device described above, there is adopted a layout in which the first actuator and the second actuator are collectively disposed at one side along an axial direction of the second oscillation axis to thereby make it possible to efficiently cool the actuators to be heat sources when driving the pixel shifting device.

In recent years, since it is desired to further reduce the weight of the projector, it is conceivable to, for example, use a lightweight material as a constituent material of the second frame extending outside the first frame with respect to the pixel shifting device described above.

Further, the projector is required to be able to project a brighter image, and it is conceivable to, for example, make the size of the liquid crystal panel as large as possible. When making the size of the liquid crystal panel large, the size of the optical member of the pixel shifting device also grows in accordance with the size of the liquid crystal panel, and therefore, there occurs a necessity of making the second frame grow in size as a result.

As described above, when using the pixel shifting device described above in the projector, it is desired to adopt the second frame light in weight and large in size. However, there arises a new problem that the second frame which is light in weight and large in size is easy to deform or to be broken when, for example, a load due to an impact caused when conveyed or dropped is applied.

SUMMARY

In order to solve the problem described above, according to an aspect of the present disclosure, there is provided a pixel shifting device including an optical member, a first frame which is configured to hold the optical member, and which oscillates around a first oscillation axis, a second frame which is disposed on a periphery of the first frame, which is coupled to the first frame, and which oscillates around a second oscillation axis perpendicular to the first oscillation axis, a base which is disposed on a periphery of the second frame, and which is coupled to the second frame, a pair of first oscillation shaft formation parts which are disposed at both sides of the first frame in a direction along the first oscillation axis, and which are configured to couple the first frame and the second frame to each other, a first actuator configured to oscillate the first frame with respect to the second frame between the first frame and the second frame, and a second actuator configured to oscillate the second frame with respect to the base between the second frame and the base, wherein the second frame and the base have an actuator holding part which extends toward one side in an axial direction along the second oscillation axis, and which is configured to hold the second actuator, and the pair of first oscillation shaft formation parts have a pair of coupling shafts which are located on the first oscillation axis, and which are configured to couple the first frame and the second frame to each other, and a pair of beams which extend along a surface of the second frame respectively from the pair of coupling shafts along the second oscillation axis.

Further, according to another aspect of the present disclosure, there is provided a projector including an image generator configured to generate image light, a projection optical system configured to project the image light, and the pixel shifting device according to the aspect described above which is disposed between the image generator and the projection optical system, and which is configured to shift a light path of the image light from the image generator.

DESCRIPTION OF EMBODIMENTS

An embodiment of the present disclosure will hereinafter be described in detail with reference to the drawings. It should be noted that the drawings used in the following description show characteristic parts in an enlarged manner in some cases for the sake of convenience in order to make the features easy to understand, and the dimensional ratios between the constituents and so on are not necessarily the same as actual ones.

Figure 1:
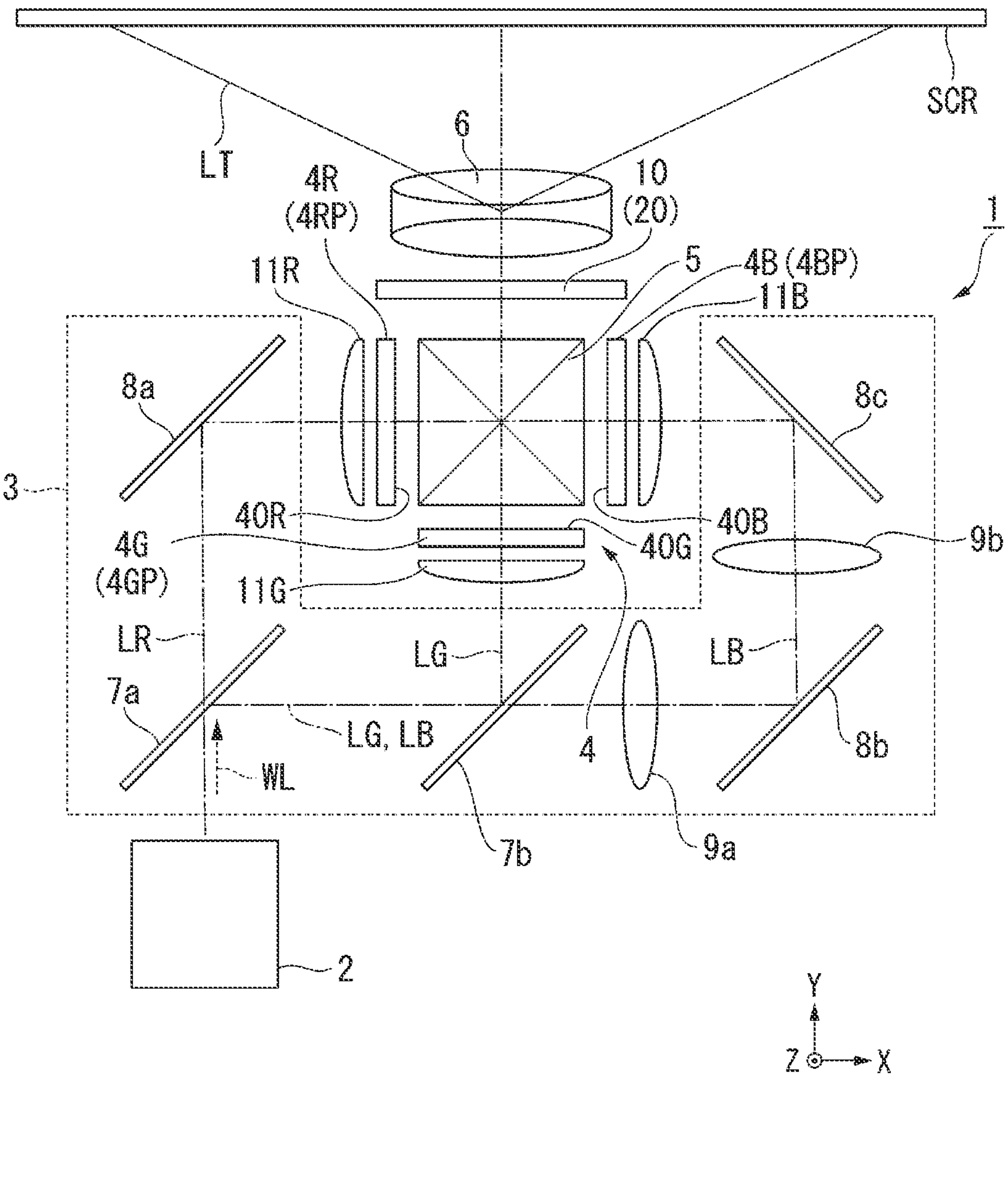
FIG. 1 is a diagram showing a schematic configuration of a projector according to an embodiment.

FIG. 1 is a diagram showing a schematic configuration of the projector according to the present embodiment.

As shown in FIG. 1, the projector 1 according to the present embodiment is provided with a light source 2, a color separation optical system 3, an image generator 4, a projection optical system 6, and a pixel shifting device 10.

Hereinafter, a layout relationship between members is described using an XYZ coordinate system shown in the drawings in some cases. In each of the drawings, the Y axis is an axis extending along a projection direction of image light LT with respect to a screen SCR in the projector 1. The X axis is an axis which is perpendicular to the Y axis, and extends along a horizontal direction of the screen SCR. The Z axis is an axis which is perpendicular to the X axis and the Y axis, and extends along a vertical direction of the screen SCR.

In the present embodiment, for example, both directions along the Z axis are collectively referred to as a "vertical direction Z" in the projector 1, a direction toward the +Z direction is referred to as an "upper side," and a direction toward the -Z direction is referred to as a "lower side." Further, both directions along the X axis are collectively referred to as a "horizontal direction X" in the projector 1, a direction toward the +X direction is referred to as a "right side," and a direction toward the -X direction is referred to as a "left side." Further, both directions along the Y axis are collectively referred to as a "front-back direction Y" in the projector 1, a direction toward the +Y direction is referred to as a "front side," and a direction toward the −Y direction is referred to as a "back side."

It should be noted that the vertical direction Z, the horizontal direction X, and the front-back direction Y are mere denotations for describing layout relationships between constituent members of the projector 1, but are not ones for defining actual installation postures and directions in the projector 1.

The light source 2 has constituents such as a laser source and a wavelength conversion element. The light source 2 collects a blue laser beam emitted from the laser source as excitation light with a light collection lens to make the result enter a wavelength conversion element including a phosphor, and then emits white light WL consisting of the blue laser beam and yellow fluorescence. It should be noted that the light source 2 is not limited to the configuration using the laser source and the wavelength conversion element, but it is possible to apply, for example, a configuration using a laser source alone, or a configuration using an LED (Light Emitting Diode) or a discharge type light source lamp.

The image generator 4 has a light modulation device 4R for emitting red image light, a light modulation device 4G for emitting green image light, a light modulation device 4B for emitting blue image light, and a light combining element 5. The image generator 4 modulates the light emitted from the light source 2 based on image information to generate the image light LT.

The color separation optical system 3 is provided with a first dichroic mirror 7*a*, a second dichroic mirror 7*b*, a first reflecting mirror 8*a*, a second reflecting mirror 8*b*, a third reflecting mirror 8*c*, a relay lens 9*a*, and a relay lens 9*b*. The color separation optical system 3 separates the white light WL having been emitted from the light source 2 into red light LR, green light LG, and blue light LB.

The first dichroic mirror 7*a* separates the white light WL emitted from the light source 2 into the red light LR, and the green light LG and the blue light LB. The first dichroic mirror 7*a* transmits the red light LR, and reflects the green light LG and the blue light LB. The second dichroic mirror 7*b* separates light having the green light LG and the blue light LB mixed with each other into the green light LG and the blue light LB. The second dichroic mirror 7*b* reflects the green light LG, and at the same time, transmits the blue light LB.

The first reflecting mirror 8*a* is disposed in a light path of the red light LR. The first reflecting mirror 8*a* reflects the red light LR, which has been transmitted through the first dichroic mirror 7*a*, toward the light modulation device 4R. The second reflecting mirror 8*b* and the third reflecting mirror 8*c* are disposed in the light path of the blue light LB. The second reflecting mirror 8*b* and the third reflecting mirror 8*c* guides the blue light LB, which has been transmitted through the second dichroic mirror 7*b*, to the light modulation device 4B.

The light modulation device 4G is constituted by a green-color liquid crystal panel 4GP and polarization plates (not shown) respectively disposed at an incident side and an exit side of the green-color liquid crystal panel 4GP. The light modulation device 4G has a first light exit surface 40G, and is disposed so that the first light exit surface 40G faces to the projection optical system 6.

The light modulation device 4R is constituted by a red-color liquid crystal panel 4RP and polarization plates (not shown) respectively disposed at an incident side and an exit side of the red-color liquid crystal panel 4RP. The light modulation device 4R has a second light exit surface 40R, and is disposed so that the second light exit surface 40R faces to the right side (+X) in the horizontal direction X perpendicular to the front-back direction Y in which the light modulation device 4G and the projection optical system 6 are disposed side by side.

The light modulation device 4B is constituted by a blue-color liquid crystal panel 4BP and polarization plates (not shown) respectively disposed at an incident side and an exit side of the blue-color liquid crystal panel 4BP. The light modulation device 4B has a third light exit surface 40B, and is disposed so that the third light exit surface 40B is opposed to the second light exit surface 40R of the light modulation device 4R. In other words, the light modulation device 4B is disposed so that the third light exit surface 40B faces to the left side (−X) in the horizontal direction X.

In particular, in the projector 1 according to the present embodiment, in order to display a brighter image, there are used large-sized panels as the liquid crystal panels 4RP, 4GP, and 4BP of the light modulation devices 4R, 4G, and 4B, respectively, as described above.

In the case of the present embodiment, the light modulation device 4G corresponds to a "first light modulation device," the light modulation device 4R corresponds to a "second light modulation device," and the light modulation device 4B corresponds to a "third light modulation device."

Hereinafter, the red-color liquid crystal panel 4RP, the green-color liquid crystal panel 4GP, and the blue-color liquid crystal panel 4BP are collectively referred to as the liquid crystal panels 4RP, 4GP, and 4BP in some cases.

The light modulation device 4R modulates the red light LR out of the white light WL emitted from the light source 2 in accordance with an image signal using the red-color liquid crystal panel 4RP. The light modulation device 4G modulates the green light LG out of the white light WL emitted from the light source 2 in accordance with the image signal using the green-color liquid crystal panel 4GP. The light modulation device 4B modulates the blue light LB out of the white light WL emitted from the light source 2 in accordance with the image signal using the blue-color liquid crystal panel 4BP. Thus, the light modulation devices 4R, 4G, and 4B each generate image light corresponding to the colored light.

At the light incident side of the light modulation device 4R, there is disposed a field lens 11R for collimating the red light LR entering the light modulation device 4R. At the light incident side of the light modulation device 4G, there is disposed a field lens 11G for collimating the green light LG entering the light modulation device 4G. At the light incident side of the light modulation device 4B, there is disposed a field lens 11B for collimating the blue light LB entering the light modulation device 4B.

The light combining element 5 is formed of a cross dichroic prism having a substantially cubic shape. The light combining element 5 combines the colored light emitted from the light exit surfaces 40R, 40G, and 40B of the light modulation devices 4R, 4G, and 4B to generate the image light LT.

The projection optical system 6 is constituted by a plurality of projection lenses. The projection optical system 6 projects the image light LT combined by the image generator 4 toward the screen SCR in an enlarged manner. Thus, a color image is displayed on the screen SCR.

The pixel shifting device 10 is disposed on the light path of the image light LT between the light combining element 5 of the image generator 4 and the projection optical system 6. It is possible for the projector 1 to display an image higher in resolution than the liquid crystal panels 4RP, 4GP, and 4BP on the screen SCR by making the pixel shifting device 10 shift the light path of the image light LT to cause so-called pixel shift. For example, when the liquid crystal panels 4RP, 4GP, and 4BP are each a liquid crystal panel compliant with the full-high definition, it is possible to display a 4K image.

Figure 2:
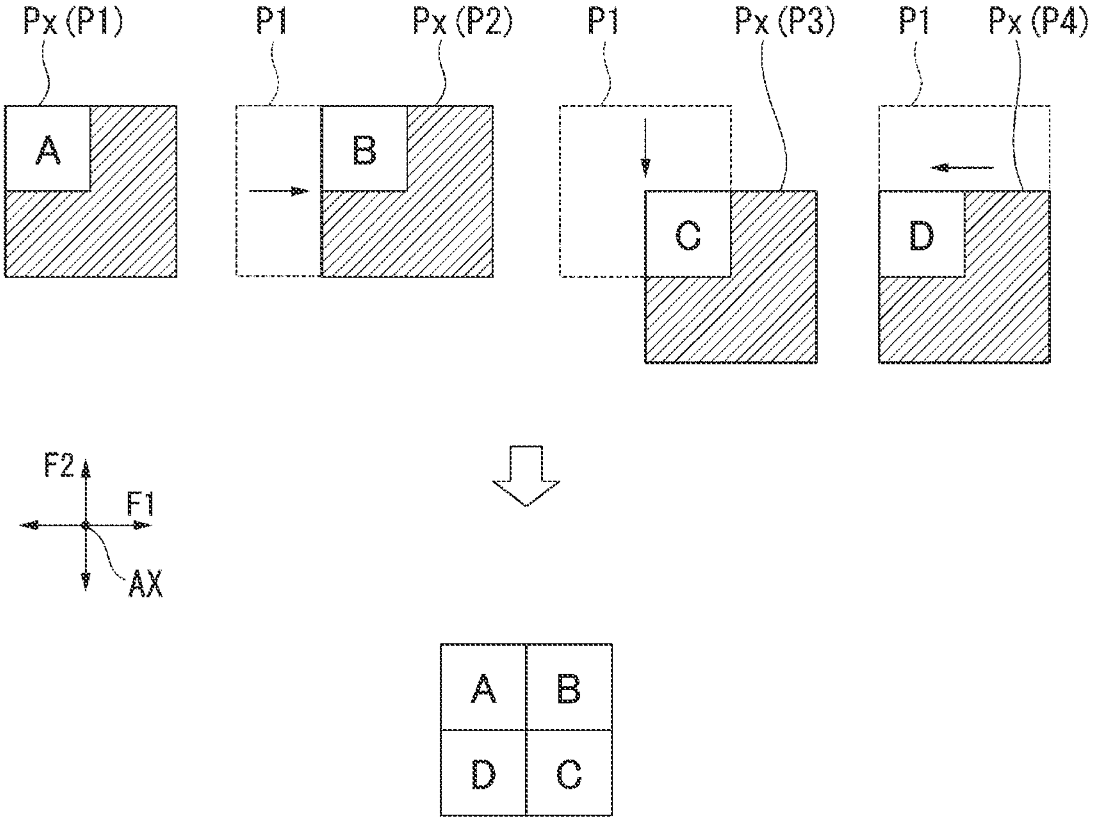
FIG. 2 is an explanatory diagram showing a principle of achieving high resolution of an image by a pixel shifting device.

Here, the principle of achieving high resolution by the light path shift will briefly be described using FIG. 2. FIG. 2 is an explanatory diagram showing the principle of achieving the high resolution by the light path shift of the image light LT.

As described later, the pixel shifting device 10 has an optical member 20 as a light transmissive substrate for transmitting the image light LT, and changes the posture of the optical member 20 to thereby shift the light path of the image light LT using refraction.

The pixel shifting device 10 oscillates the optical member 20 in two directions, namely a first oscillation direction around a first oscillation axis J1 crossing a light axis AX, and a second oscillation direction around a second oscillation axis J2 crossing the light axis AX and crossing the first oscillation axis J1. When the optical member 20 oscillates in the first oscillation direction, the light path of the light entering the optical member 20 is shifted toward a first direction F1 shown in FIG. 2.

When the optical member 20 oscillates in the second oscillation direction, the light path of the light entering the optical member 20 is shifted toward a second direction F2 crossing the first direction F1 shown in FIG. 2. Thus, a pixel Px to be displayed on the screen SCR is displayed at a position shifted in the first direction F1 and the second direction F2 crossing the first direction F1. In the case of the present embodiment, the first direction F1 corresponds to the horizontal direction X, and the second direction F2 corresponds to the vertical direction Z.

The projector 1 combines the shift of the light path in the first direction F1 and the shift of the light path in the second direction F2 with each other to thereby increase the apparent number of pixels to achieve the high resolution of the image light LT to be projected on the screen SCR. For example, as shown in FIG. 2, the pixel Px is moved to a position shifted as much as a half pixel in each of the first direction F1 and the second direction F2. Thus, it is possible to move the image display position on the screen SCR to an image display position P2 shifted from an image display position P1 along the first direction F1 as much as a half pixel, an image display position P3 shifted from the image display position P1 along each of the first direction F1 and the second direction F2 as much as a half pixel, and an image display position P4 shifted from the image display position P1 along the second direction F2 as much as a half pixel. In FIG. 2, there is shown a shift operation of A→B→C→D paying attention to an area of a fourth of the pixel Px.

As shown in FIG. 2, the light path shifting operation is performed to display an image at each of the image display positions P1, P2, P3, and P4 for a certain period of time to vary the display content in the liquid crystal panels 4RP, 4GP, and 4BP in sync with the light path shifting operation. Thus, it is possible to apparently display the pixels A, B, C, and D smaller in size than the pixel Px. For example, when performing display of the pixels A, B, C, and D with a frequency of 60 Hz as a whole, it is necessary to make the liquid crystal panels 4RP, 4GP, and 4BP perform the display at quad speed in accordance with the image display positions P1, P2, P3, and P4. In other words, the frequency of the display, namely a so-called refresh rate, in each of the liquid crystal panels 4RP, 4GP, and 4BP becomes 240 Hz.

It should be noted that in the example shown in FIG. 2, the first direction F1 and the second direction F2 are directions perpendicular to each other, and are arrangement directions of the pixels Px to be displayed in a matrix on the screen SCR. Instead of this configuration, the first direction F1 and the second direction F2 are not required to be the directions perpendicular to each other, and can be directions tilted with respect to the arrangement directions of the pixels Px. Even with such shifting directions, by arbitrarily combining the pixel shifts toward the first direction F1 and the second direction F2 with each other, it is possible to move the pixel Px to the image display positions P1, P2, P3, and P4 shown in FIG. 2. Further, the shift amount of the image display position is not limited to a half pixel, but can also be, for example, a fourth of the pixel Px, or three fourths thereof.

Figure 3:
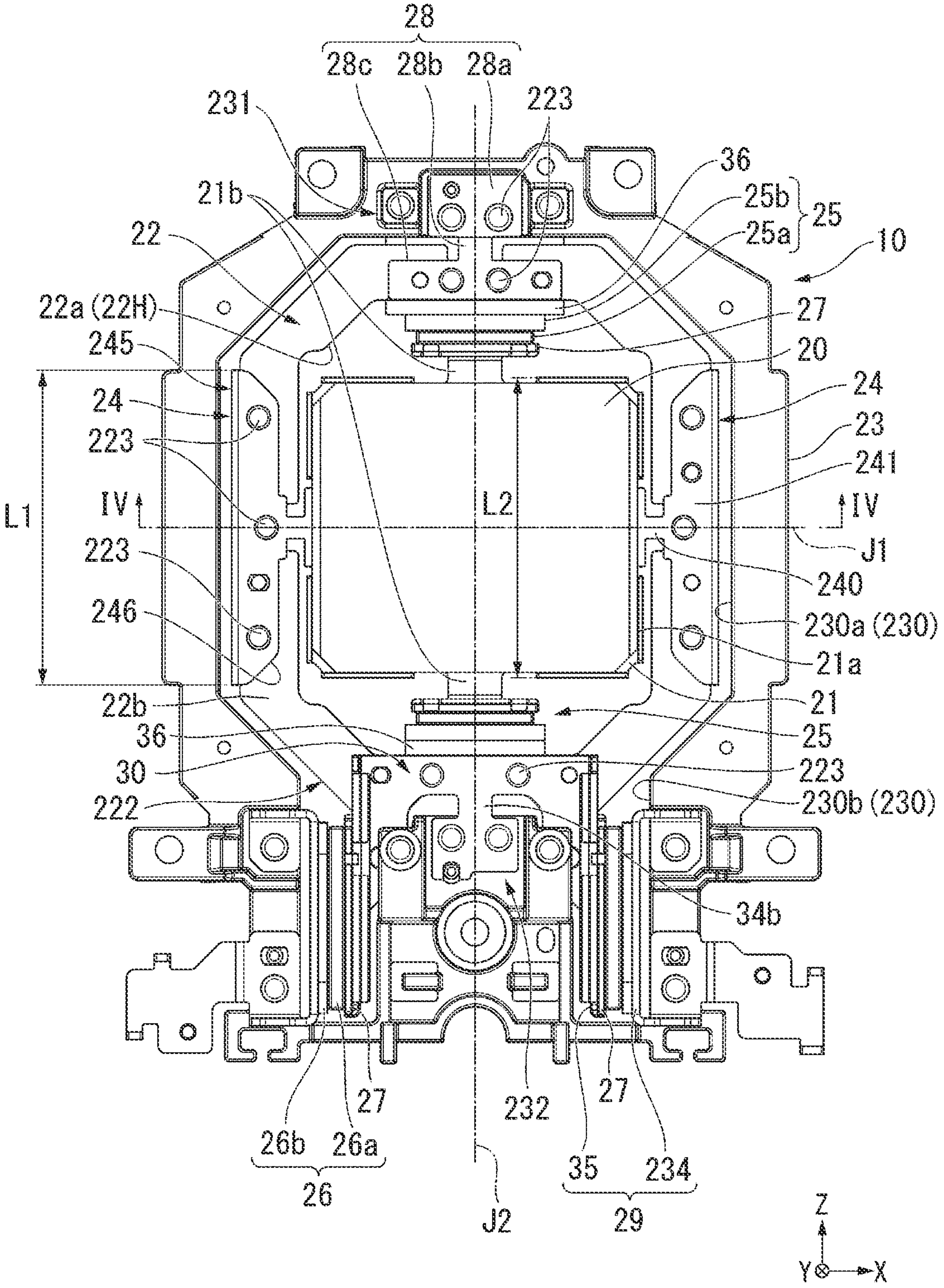
FIG. 3 is a plan view of the pixel shifting device.

Subsequently, a configuration of the pixel shifting device 10 will be described. FIG. 3 is a plan view of the pixel shifting device 10. FIG. 3 is a plan view of the pixel shifting device 10 viewed from the −Y side toward the +Y side.

As shown in FIG. 3, the pixel shifting device 10 is provided with an optical member 20, a first frame 21, a second frame 22, a base 23, a pair of first oscillation shaft formation parts 24, a pair of first actuators 25, a pair of second actuators 26, and a frame reinforcement member 30.

In FIG. 3, there is shown a state in which the pixel shifting device 10 does not change the posture of the optical member 20, namely a state in which the pixel shifting device 10 does not operate.

The pixel shifting device 10 shifts the light path of the image light LT in accordance with the posture of the optical member 20 which the image light LT having entered the pixel shifting device 10 from the image generator 4 enters. The shift amount of the light path of the image light LT is defined (see FIG. 2) in accordance with a degree of a change in posture of the optical member 20.

The optical member 20 is a member which shifts the light path of the image light LT which enters the optical member 20 from the image generator 4, using the refraction. When the pixel shifting device 10 is located at a reference position where the incident angle of the image light LT with respect to the optical member 20 is 0°, a normal direction of the optical member 20 coincides with the front-back direction Y.

As the optical member 20, there is used, for example, super white glass having a substantially square shape. By adopting the super white glass excellent in strength, the rigidity of the whole of the optical member 20 is increased, and therefore, it is possible to suppress the distortion caused in the optical member 20.

It should be noted that the material of the optical member 20 is not limited to the super white glass, it is sufficient for the material of the optical member 20 to be a material which has light transmissive property, and which is capable of refracting light, and it is possible to use a variety of glass materials such as borosilicate glass or quartz glass. Alternatively, it is also possible to use a variety of crystalline materials such as quartz crystal or sapphire, or a variety of resin materials such as polycarbonate series resin or acrylic resin. It should be noted that the shape of the optical member 20 is not limited to the substantially square shape, and can also be a rectangular shape, a rhombic shape, or an elliptical shape.

The first frame 21 is a frame which holds the optical member 20 and which oscillates around the first oscillation axis J1. The first oscillation axis J1 of the first frame 21 is an imaginary axis passing through the center of the optical member 20 supported by the first frame 21.

The first frame 21 is a frame made of metal and having a frame-like shape, and is disposed on the periphery of the optical member 20. The first frame 21 supports an outer circumferential edge of the optical member 20 to thereby house the optical member 20 in a state in which obverse and reverse surfaces are exposed. As the material of the first frame 21, there is used, for example, stainless steel as a metal material having predetermined rigidity. The optical member 20 is fixed to the first frame 21 with an adhesive. It should be noted that the first frame 21 is not limited to the frame-like shape, and is only required to be a member for supporting at least a part of the optical member 20.

The second frame 22 is a frame which oscillates around the second oscillation axis J2 perpendicular to the first oscillation axis. The second oscillation axis J2 of the second frame 22 is an imaginary axis which is perpendicular to the first oscillation axis J1, and which passes through the center of the optical member 20 supported by the first frame 21.

The second frame 22 is formed of a plane member having a substantially octagonal shape in a plan view, and has an opening section 22H having a substantially octagonal shape. Inside the opening section 22H of the second frame 22, there is disposed the first frame 21 for holding the optical member 20. In other words, the second frame 22 is formed of a frame-like member surrounding the first frame 21, and is disposed on the periphery of the first frame 21, and is at the same time coupled to the first frame 21.

The second frame 22 is coupled to the first frame 21 via the pair of first oscillation shaft formation parts 24. Further, the second frame 22 is coupled to the base 23 via a first coupling shaft part 28*b* of a base coupling member 28 and a second coupling shaft part 34*b* of the frame reinforcement member 30 described later. It should be noted that configurations of the pair of first oscillation shaft formation parts 24, the base coupling member 28, and the frame reinforcement member 30 will be described later.

Based on such configurations, in the pixel shifting device 10 according to the present embodiment, the optical member 20 supported by the second frame 22 via the first frame 21 rotates around the second oscillation axis J2 with respect to the base 23 to thereby be able to change the posture.

In the case of the present embodiment, the second frame 22 and the first frame 21 are disposed to at least partially overlap each other in the front-back direction Y.

In other words, at least a part of the second frame 22 and at least a part of the first frame 21 are disposed on the same plane parallel to the X-Z plane. It should be noted that it is sufficient for the second frame 22 to have a shape which is disposed to surround the periphery of the first frame 21 in the plan view in the front-back direction Y, and the position with respect to the first frame 21 can be shifted in the front-back direction Y. In other words, the second frame 22 and the first frame 21 can be disposed in a state in which the positions of the second frame 22 and the first frame 21 are shifted in the front-back direction Y from each other.

The base 23 is formed of a metal member made of aluminum or the like. The base 23 has an opening section 230, a primary second frame fixation part 231, a secondary second frame fixation part 232, and a pair of second coil holders 234.

The opening section 230 is constituted by a first opening 230*a* and a second opening 230*b* communicated with each other. The second frame 22 is located inside the first opening 230*a* of the opening section 230, and the frame reinforcement member 30 is located inside the second opening 230*b* of the opening section 230.

The primary second frame fixation part 231 fixes the base coupling member 28 located at an upper side (+Z) in the vertical direction Z of the second frame 22.

The secondary second frame fixation part 232 fixes the frame reinforcement member 30 located at a lower side (−Z) in the vertical direction Z of the second frame 22.

The pair of second coil holders 234 respectively hold coils of the pair of second actuators 26 described later. The pair of second coil holders 234 are disposed to be opposed respectively to a pair of second magnet holders 35 provided to the frame reinforcement member 30 described later in a direction perpendicular to the second oscillation axis J2 out of the base 23.

In other words, the base 23 is disposed on the periphery of the second frame 22, and is at the same time, coupled to the second frame 22.

In the case of the present embodiment, the second frame 22 and the base 23 are disposed to at least partially overlap each other in the front-back direction Y. In other words, at least a part of the second frame 22 and at least a part of the base 23 are disposed on the same plane parallel to the X-Z plane. It should be noted that it is sufficient for the base 23 to have a shape which is disposed to surround the periphery of the second frame 22 in the plan view in the front-back direction Y, and the position with respect to the second frame 22 can be shifted in the front-back direction Y. In other words, the second frame 22 and the base 23 can be disposed in a state in which the positions of the second frame 22 and the base 23 are shifted in the front-back direction Y from each other.

The pair of first oscillation shaft formation parts 24 are disposed at both sides of the first frame 21 in the horizontal direction X as a direction along the first oscillation axis J1, and couple the first frame 21 and the second frame 22 to each other. Although in the case of the present embodiment, the pair of first oscillation shaft formation parts 24 are formed integrally with the first frame 21, the pair of first oscillation shaft formation parts 24 and the first frame 21 can be formed separately from each other.

The pair of first oscillation shaft formation parts 24 are fixed to an obverse surface 22*b* of the second frame 22 via screw members 223. The obverse surface 22*b* of the second frame 22 is a surface facing to the back side (−Y) in the front-back direction Y, and a surface at a side where the image generator 4 is disposed to the pixel shifting device 10.

In the pixel shifting device 10 according to the present embodiment, the pair of first oscillation shaft formation parts 24 are symmetrically disposed centering on the second oscillation axis J2. In the present embodiment, the expression that the pair of first oscillation shaft formation parts 24 are symmetrically disposed means that the first oscillation shaft formation parts 24 have substantially the same shapes, and when one of the formation parts is turned over the other of the formation parts with reference to the second oscillation axis J2, the one of the formation parts overlaps the other of the formation parts. According to the pixel shifting device 10 related to the present embodiment, since the first frame 21 and the second frame 22 are coupled to each other in a balanced manner with the pair of first oscillation shaft formation parts 24, it is possible to oscillate the optical member 20 in a stable state around the first oscillation axis J1.

The pair of first oscillation shaft formation parts 24 have a pair of coupling shaft parts 240 and a pair of beams 241. The pair of coupling shaft parts 240 are located on the first oscillation axis J1 of the first frame 21, and each swingably couple an outer side surface 21*a* of the first frame 21 and an inner side of the second frame 22 to each other. The pair of coupling shaft parts 240 respectively protrude from surfaces facing to directions opposite to each other out of four outer side surfaces 21*a* of the first frame 21 having a rectangular frame-like shape, and couple the first frame 21 and the second frame 22 to each other.

Based on such configurations, in the pixel shifting device 10 according to the present embodiment, the optical member 20 supported by the first frame 21 rotates around the first oscillation axis J1 with respect to the second frame 22 to thereby be able to change the posture.

The pair of beams 241 extend along the second oscillation axis J2 respectively from the pair of coupling shaft parts 240, and along the obverse surface 22*b* of the second frame 22. The second frame 22 is increased in strength of portions in which the pair of beams 241 are disposed. According to the pixel shifting device 10 related to the present embodiment, by disposing the beams 241 of the pair of first oscillation shaft formation parts 24 on the obverse surface 22*b* of the second frame 22, it is possible to increase the strength of peripheral areas of the coupling portions in the second frame 22 to the first frame 21.

In the present embodiment, the pair of beams 241 are each disposed to straddle the first oscillation axis J1. Each of the beams 241 is disposed at both sides of the first oscillation axis J1. In the case of the present embodiment, the pair of beams 241 are each disposed symmetrically centering on the first oscillation axis J1.

Based on such a configuration, it is possible for each of the beams 241 of the first oscillation shaft formation parts 24 to increase the strength of the portion extending in the vertical direction Z perpendicular to the first oscillation axis J1 out of the second frame 22 in a balanced manner.

A first length L1 in the vertical direction Z along the second oscillation axis J2 in each of the beams 241 is a length corresponding to a second length L2 in the vertical direction Z along the second oscillation axis J2 of the first frame 21.

In the present specification, the expression that the first length L1 is the length corresponding to the second length L2 means that the first length L1 and the second length L2 are substantially equal to each other. It should be noted that the expression that the first length L1 and the second length L2 are substantially equal to each other includes not only a state in which the first length L1 and the second length L2 completely coincide with each other, but also a state in which one of the first length L1 and the second length L2 is longer or shorter as much as several millimeters compared to the other. It should be noted that the first length L1 in the vertical direction Z of the beam 241 can be made equal to the length in the vertical direction Z of the optical member 20 held by the first frame 21.

According to this configuration, since the pair of beams 241 having the length corresponding to the first frame 21 are disposed to overlap the second frame 22, it is possible to sufficiently increase the rigidity of the second frame 22.

Therefore, in the pixel shifting device 10 according to the present embodiment, even when using the second frame 22 formed of a lightweight material small in thickness, it is possible to ensure the sufficient rigidity as the second frame 22, and therefore, it is possible to realize a reduction in size and a reduction in weight of the device itself.

Figure 4:
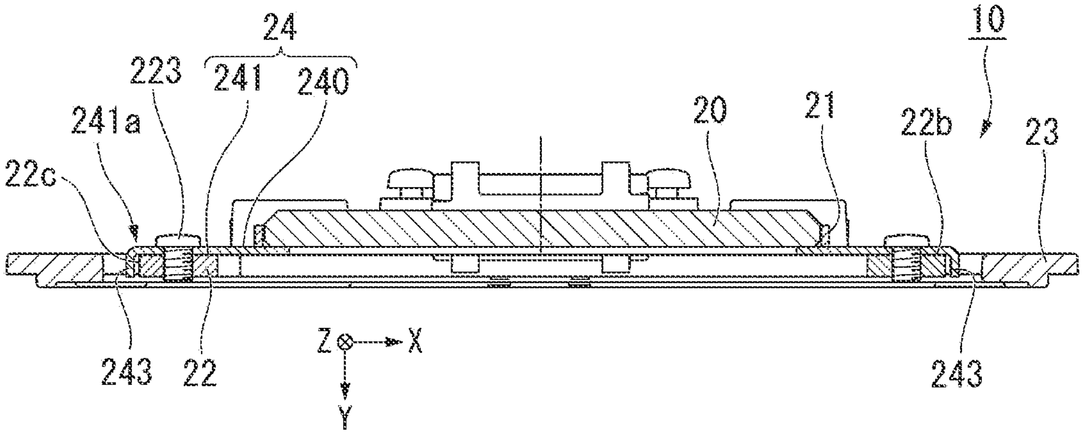
FIG. 4 is a cross-sectional view as an arrow view along the line IV-IV in FIG. 3.

FIG. 4 is a cross-sectional view of an essential part of the pixel shifting device 10. FIG. 4 is a cross-sectional view as an arrow view along the line IV-IV in FIG. 3.

As shown in FIG. 4, the pair of beams 241 each have a rising wall part 243 which extends in the vertical direction Z along the second oscillation axis J2, rises along the front-back direction Y as the normal direction of the obverse surface 22*b* of the second frame 22, and extends in the vertical direction Z along the second oscillation axis J2. In the present embodiment, the rising wall part 243 corresponds to an "uprise wall part."

The rising wall part 243 is disposed in an end portion 241*a* at the base 23 side in each of the pair of beams 241. In the case of the present embodiment, the rising wall part 243 extends toward the projection optical system 6 along the outer side surface 22*c* of the second frame 22. Since the pair of beams 241 are each provided with the rising wall part 243, the cross-sectional surface along the X-Y plane thereof has a substantially L shape, and thus, it is possible to make a second moment of area higher compared to a structure in which the rising wall part 243 is not disposed. Therefore, it is possible for the pair of beams 241 to increase the rigidity of the second frame 22 while keeping the first length L1 in the vertical direction Z at a minimum. Therefore, it is possible for the pixel shifting device 10 according to the present embodiment to efficiently increase the rigidity of the second frame 22 while suppressing an increase in weight by suppressing the length of the pair of beams 241.

Going back to FIG. 3, in the plan view in the front-back direction Y as the normal direction of the obverse surface 22*b* of the second frame 22, both end portions 245 in the vertical direction Z along the second oscillation axis J2 in each of the pair of beams 241 each have an oblique side 246 with which the length in the vertical direction Z increases in a direction from the first frame 21 side toward the base 23 side. In other words, the both end portions 245 of each of the beams 241 each have a shape having a width in the vertical direction Z spreading in a direction from the inner side toward the outer side of the second frame 22 to form a tapered shape due to the oblique side 246.

The inventors conducted a simulation of the case of adopting a rectangular shape as the planar shape of each of the beams 241, namely when the tapered shape is not provided to each of the both end portions of each of the beams 241.

According to the present simulation, it was successfully confirmed that providing the rectangular shape to the planar shape of each of the beams 241 does not make a contribution to the rigidity of each of the beams 241.

In contrast, in the pixel shifting device 10 according to the present embodiment, by disposing the oblique sides 246 in the both end portions 245 of each of the beams 241 as described above, it is possible to achieve the reduction in weight while ensuring the rigidity of each of the beams 241.

Here, a resonance frequency of the second frame 22 varies in accordance with the length of the pair of beams 241. In the pixel shifting device 10 according to the present embodiment, by arbitrarily adjusting the length of the pair of beams 241, the resonance frequency of the second frame 22 is set to a desired value. Specifically, in the pixel shifting device 10 according to the present embodiment, by appropriately adjusting the length of the pair of beams 241, the resonance frequency of the second frame 22 is shifted to a high frequency. Thus, it is possible for the second frame 22 to prevent the resonance from occurring without increasing the size or increasing the thickness. Therefore, according to the pixel shifting device 10 related to the present embodiment, it is possible to provide the pixel shifting device in which a problem caused by the resonance is prevented from occurring, and is high in reliability, while achieving the reduction in size of the device configuration.

As described above in the pixel shifting device 10 according to the present embodiment, since the pair of beams 241 of the pair of first oscillation shaft formation parts 24 for coupling the first frame 21 and the second frame 22 to each other are formed along the obverse surface 22*b* of the second frame 22, it is possible to increase the strength of the second frame 22 in which the beams 241 are disposed.

Since the pair of first oscillation shaft formation parts 24 are each provided with the beam 241 extending from the coupling shaft part 240 for coupling the first frame 21 for supporting the optical member 20 and the second frame 22 to each other on the first oscillation axis J1 to the obverse surface 22*b* of the second frame 22 in the vertical direction Z along the second oscillation axis J2, it is possible to efficiently increase the strength in the vicinity of the coupling portion of the second frame 22 to the first frame 21.

For example, when a load by a vibration when transporting the projector 1, or by an impact caused by accidentally dropping the projector 1 is applied, a particularly heavy load occurs on the periphery of the coupling portion of the second frame 22 to the first frame 21 for supporting the optical member 20. In contrast, in the pixel shifting device 10 according to the present embodiment, by increasing the strength of the coupling portion in the second frame 22 to the first frame 21 using the pair of first oscillation shaft formation parts 24 as described above, it is possible to prevent a deformation and a breakage of the second frame 22. Therefore, the pixel shifting device 10 according to the present embodiment is made enhanced in resistance to an impact load, and high in reliability.

The base coupling member 28 is a member for coupling the second frame 22 and the base 23 to each other on the second oscillation axis J2. The base coupling member 28 has a base fixation part 28*a*, the first coupling shaft part 28*b*, and a frame fixation part 28*c*. The base coupling member 28 is fixed to the base 23 and the second frame 22 via the screw members 223.

The frame fixation part 28*c* fixes the base coupling member 28 to an upper end portion located at the upper side (+Z) in the vertical direction Z of the second frame 22. The base fixation part 28*a* fixes the base coupling member 28 to the primary second frame fixation part 231 of the base 23. The first coupling shaft part 28*b* couples the frame fixation part 28*c* and the base fixation part 28*a* to each other to oscillate the second frame 22 around the second oscillation axis J2 with respect to the base 23.

It should be noted that the base coupling member 28 can be formed integrally with the second frame 22.

Each of the pair of first actuators 25 generates a drive force of oscillating the first frame 21 with respect to the second frame 22 between the first frame 21 and the second frame 22.

Each of the pair of first actuators 25 is disposed on the second oscillation axis J2 perpendicular to the first oscillation axis J1, and has a first magnet 25*a* disposed on the first frame 21, and a first coil 25*b* disposed on the base 23 and opposed to the first magnet 25*a*.

The pair of first actuators 25 are disposed symmetrically at both sides in the vertical direction Z centering on the first oscillation axis J1 with respect to the optical member 20 held by the first frame 21. The pair of first actuators 25 are located at equal distance from the first oscillation axis J1, and are therefore disposed to be able to transmit the drive forces to the first frame 21 holding the optical member 20 in a balanced manner. Therefore, it is possible for the pixel shifting device 10 according to the present embodiment to rotate the first frame 21 around the first oscillation axis J1 without a deflection using the pair of first actuators 25.

The first magnet 25*a* is disposed on the first frame 21 via a magnet holding plate 27. Specifically, the first magnet 25*a* is disposed in a first magnet holder 21*b* disposed in a region located on the second oscillation axis J2 out of the outer side surfaces 21*a* of the first frame 21.

The magnet holding plate 27 is formed of metal such as iron, and functions as a back yoke. It is sufficient for a magnet used as the first magnet 25*a* to be a permanent magnet having a predetermined magnetic force besides a neodymium magnet, and it is possible to adopt a samarium-cobalt magnet, a ferrite magnet, or an alnico magnet.

The first coil 25*b* is disposed on the inner side surface 22*a* of the second frame 22 via a coil holder member 36. The coil holder member 36 is fixed to the base 23, and arranges the first coil 25*b* and the first magnet 25*a* to be opposed to each other via a gap. The coil holder member 36 is formed of metal such as iron, and functions as a back yoke. The first coil 25*b* is formed of a coil wire wound around the coil holder member 36.

It should be noted that the positions of the first magnet 25*a* and the first coil 25*b* can be exchanged, and it is possible to dispose the first magnet 25*a* in the magnet holder extending from the base 23, and to dispose the first coil 25*b* in the coil holder member disposed on the outer side surface 21*a* of the first frame 21.

Each of the pair of second actuators 26 is a device for oscillating the second frame 22 with respect to the base 23 between the second frame 22 and the base 23.

It is desirable for the pair of second actuators 26 to be disposed to be symmetric at both sides in the horizontal direction X centering on the second oscillation axis J2 with respect to the optical member 20 which the second frame 22 holds via the first frame 21 similarly to the first actuators 25 to thereby increase the transmission efficiency of the respective drive forces. In other words, it is desirable to dispose the pair of second actuators 26 on the first oscillation axis J1.

Here, a positional relationship between the pixel shifting device 10 and the image generator 4 in the projector 1 according to the present embodiment will be described.

Figure 5:
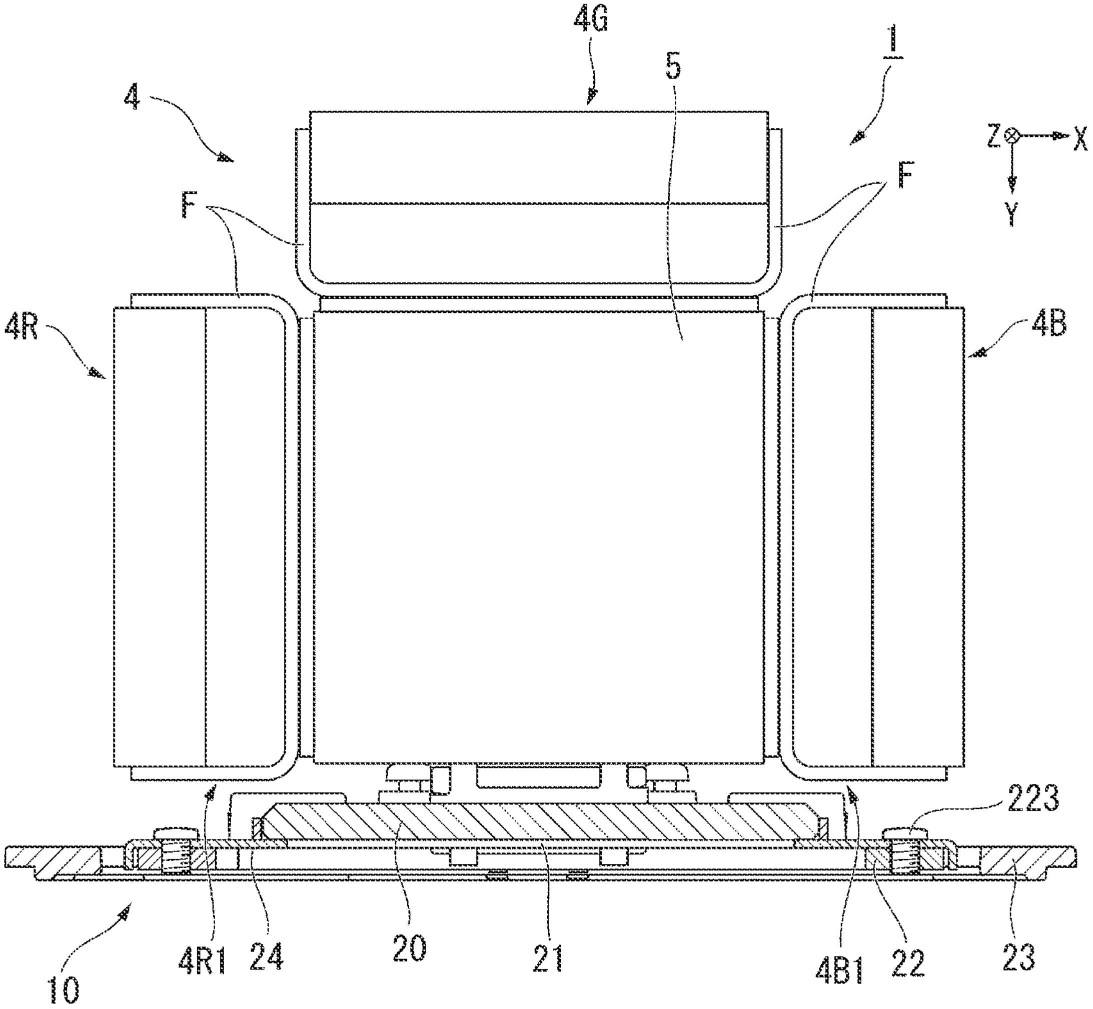
FIG. 5 is a diagram showing a positional relationship between the pixel shifting device and an image generator.

FIG. 5 is a diagram showing the positional relationship between the pixel shifting device 10 and the image generator 4. FIG. 5 is a cross-sectional view with a plane along the X-Y plane.

As shown in FIG. 5, the image generator 4 is unitized by integrally holding the light modulation devices 4R, 4G, and 4B and the light combining element 5 via a frame member F.

In the projector 1 according to the present embodiment, the light modulation devices 4R, 4B out of the light modulation devices 4R, 4G, and 4B are set in a state of coming closer to the pixel shifting device 10.

In the image generator 4 in the present embodiment, the light modulation devices 4R, 4G, and 4B are made larger in width than the light combining element 5.

In the pixel shifting device 10 according to the present embodiment, in the front-back direction Y in which the light modulation device 4G and the projection optical system 6 are disposed side by side, front end portions 4R1, 4B1 located at the projection optical system 6 side of the light modulation device 4R and the light modulation device 4B each overlap the pixel shifting device 10. Therefore, the front end portions 4R1, 4B1 of the light modulation device 4R and the light modulation device 4B are extremely close to the pixel shifting device 10. More specifically, the front end portions 4R1, 4B1 of the light modulation devices 4R, 4B are each disposed adjacent to the first frame 21, the second frame 22, and the base 23 of the pixel shifting device 10.

The pixel shifting device 10 according to the present embodiment is provided with the first oscillation shaft formation parts 24 to thereby be increased in strength of the second frame 22, and therefore, there is no need to increase the thickness for increasing the strength even when making the second frame 22 grow in size. As described above, in the pixel shifting device 10 according to the present embodiment, since it is possible to decrease the thickness of the second frame 22, it is possible to achieve a reduction in size of the device configuration by arranging the front end portions 4R1, 4B1 of the light modulation devices 4R, 4B and the pixel shifting device 10 to be close to each other in the front-back direction Y.

In contrast, in the projector 1 according to the present embodiment, since the front end portions 4R1, 4B1 of the light modulation devices 4R, 4B are disposed to be close to the second frame 22 and the base 23 out of the pixel shifting device 10, it is difficult to dispose the second actuators on the first oscillation axis J1.

Therefore, in the pixel shifting device 10 according to the present embodiment, the pair of second actuators 26 are held in actuator holding parts 29 disposed at a lower side (−Z) as one side in the vertical direction Z along the second oscillation axis J2 with respect to the first oscillation axis J1. The actuator holding parts 29 are disposed to be paired with the respective second actuators 26.

The pair of actuator holding parts 29 are located at the lower side (−Z) as an opposite side to the first oscillation axis J1 with respect to the first actuators 25. In the case of the present embodiment, the pair of second actuators 26 are disposed at the lower side (−Z) of the first actuators 25 located at the lower side (−Z) of the optical member 20.

The pair of actuator holding parts 29 are disposed in an area extending at the lower side (−Z) in the vertical direction Z in the second frame 22 and the base 23. The pair of actuator holding parts 29 are constituted by the pair of second magnet holders 35 of the frame reinforcement member 30 described later, and a pair of second coil holders 234 of the base 23.

The second actuators 26 each have a magnet and a coil disposed at a predetermined distance in a direction along the first oscillation axis J1. Specifically, the second actuators 26 each have a second magnet 26*a* disposed in the second magnet holder 35 of the second frame 22 constituting the actuator holding part 29, and a second coil 26*b* which is disposed in the second coil holder 234 of the base 23 constituting the actuator holding part 29, and which is opposed to the second magnet 26*a* in a direction along the first oscillation axis J1 crossing the second oscillation axis J2.

The second magnet 26*a* is disposed on the second magnet holder 35 via the magnet holding plate 27 which functions as the back yoke. The second coil holder 234 for holding the second coil 26*b* functions as the back yoke.

The second magnet 26*a* and the second coil 26*b* have substantially the same configurations as those of the first magnet 25*a* and the first coil 25*b* constituting the first actuator 25, and therefore, the description thereof will be omitted.

It should be noted that the positions of the second magnet 26*a* and the second coil 26*b* can be exchanged, and it is possible to dispose the second magnet 26*a* at the base 23 side, and to dispose the second coil 26*b* at the second frame 22 side.

As described above, in the pixel shifting device 10 according to the present embodiment, the second actuators 26 are disposed in an area at the side of the second frame 22 at which the first actuator 25 is disposed. More specifically, in the pixel shifting device 10 according to the present embodiment, there is adopted a structure in which the first actuator 25 and the second actuators 26 are intensively disposed at the lower side (−Z) in the vertical direction Z along the second oscillation axis J2 with respect to the optical member 20.

According to the projector 1 related to the present embodiment, by aggregating the second actuators 26 at one side of the first actuators 25, it is possible to dispose the pixel shifting device 10 in the state of being close to the image generator 4 in the front-back direction Y. Therefore, it is possible to reduce the size in the front-back direction Y of the projector 1 according to the present embodiment. Further, it is possible for the pixel shifting device 10 to efficiently take in the image light LT emitted from the projection optical system 6 of the image generator 4, and thus, it is possible to increase the light use efficiency of the image light LT.

Figure 6:
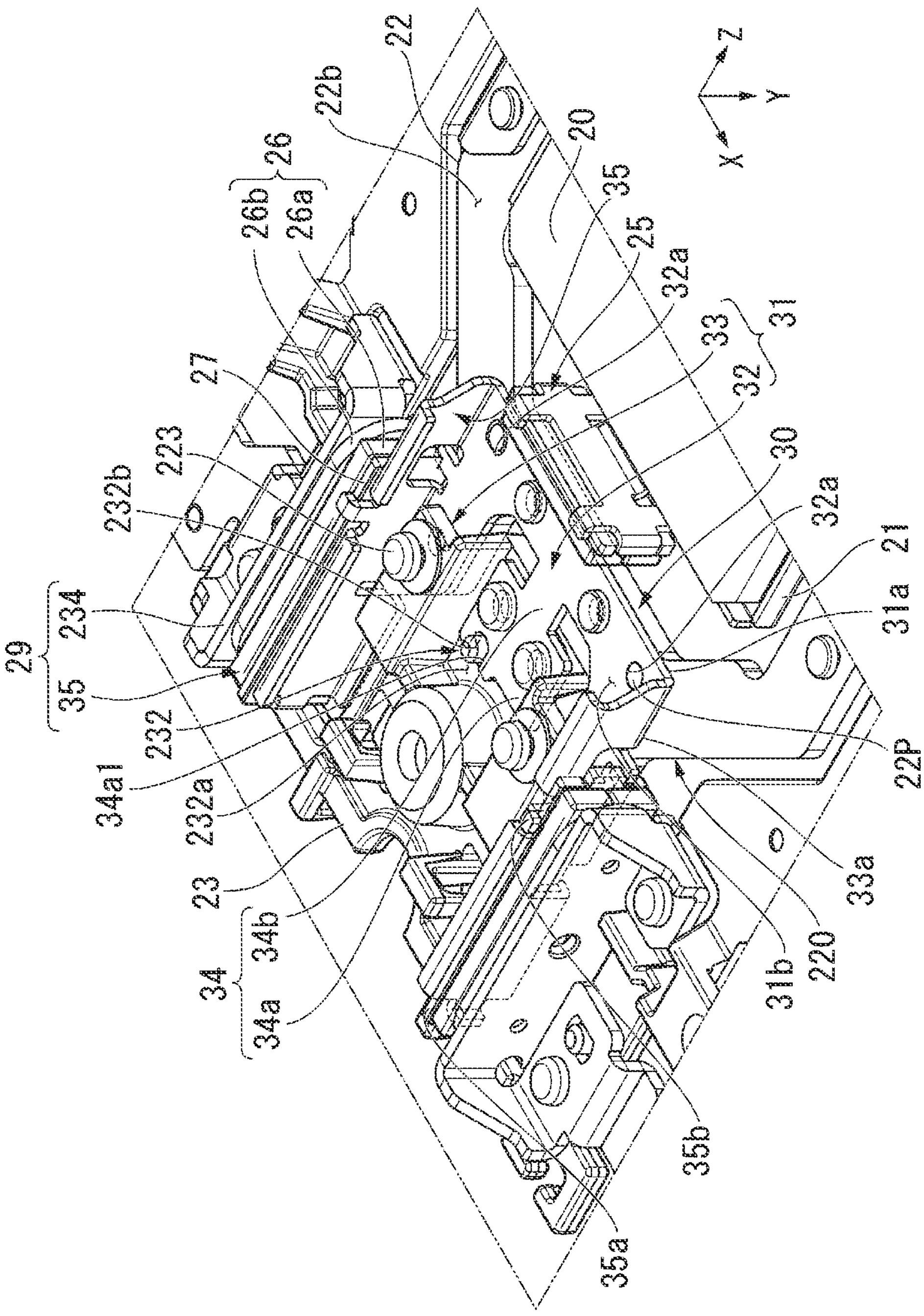
FIG. 6 is a perspective view showing a configuration of an essential part of a second frame.

On the other hand, in the pixel shifting device 10 according to the present embodiment, it is necessary to dispose the second actuators 26 at the lower side (−Z) of the first actuator 25 as described above. Therefore, as shown in FIG. 3 and FIG. 6, the second frame 22 in the present embodiment has an extending part 220 which extends toward an opposite side to the first oscillation axis J1 with respect to the first actuator 25, and toward one side (−Z) in an axial direction along the second oscillation axis J2, and holds the magnets as the constituents of the second actuators 26 via the frame reinforcement member 30 fixed to the extending part 220.

As described above, in the pixel shifting device 10 according to the present embodiment, since a distance from the second actuators 26 to the optical member 20 is longer compared to a distance from the first actuator 25 to the optical member 20, there is created a structure in which the drive forces of the second actuators 26 are difficult to be transferred to the optical member 20 side.

To cope with the above, in the pixel shifting device 10 according to the present embodiment, in order to make it possible for the second frame 22 to easily oscillate in response to the drive forces of the second actuators 26 efficiently transferred to the optical member 20 side, it is disposed that the second frame 22 is formed of a lightweight material such as aluminum.

In general, the lightweight material such as aluminum is low in rigidity. Therefore, there is a possibility that a deterioration in durability, a deformation, and so on occur in the second frame 22 formed of the lightweight material due to a concentration of the stress generated due to the drive forces of the first actuators 25 and the second actuators 26.

In particular, in the projector 1 according to the present embodiment, in order to display a bright image as described above, there are used the large-sized panels as the liquid crystal panels 4RP, 4GP, and 4BP of the light modulation devices 4R, 4G, and 4B, respectively, and thus, the optical member 20 grows in size, and therefore, the first frame 21 and the second frame 22 also grow in size as a result. When forming such a large-sized second frame 22 from such a lightweight material as described above, there is a possibility that the risk of the deterioration in durability, the deformation, and so on described above further increases.

In the pixel shifting device 10 according to the present embodiment, it is disposed that the rigidity of the second frame 22 is increased by disposing the frame reinforcement member 30 in the area at the side in the second frame 22 at which the first actuator 25 and the second actuators 26 are intensively disposed, specifically in the extending part 220. The frame reinforcement member 30 and a peripheral configuration of the second frame 22 in which the frame reinforcement member 30 is disposed will hereinafter be described.

FIG. 6 is a perspective view showing a configuration of an essential part of the second frame 22 in which the frame reinforcement member 30 is disposed.

As shown in FIG. 6, the frame reinforcement member 30 is formed of a sheet-metal member made of, for example, austenite stainless steel, and has predetermined rigidity. The frame reinforcement member 30 can be formed of a single plate member, or can also be divided into two plate members as long as the object of sufficiently increasing the rigidity of the second frame 22 can be achieved.

The frame reinforcement member 30 is fixed to the extending part 220 located at the lower side (−Z) in the vertical direction Z of the second frame 22 via the screw members 223. The frame reinforcement member 30 includes a main body part 31 formed of a substantially U-shape in a plan view, the second magnet holders 35 for holding the magnets of the second actuators 26 described later, and a base coupling part 34 to be coupled to the secondary second frame fixation part 232 of the base 23.

The main body part 31 of the frame reinforcement member 30 has a first surface 31*a* having contact with the obverse surface 22*b* of the second frame 22, and a second surface 31*b* opposite to the first surface 31*a*. The main body part 31 of the frame reinforcement member 30 includes a first wall part 32 extending in the horizontal direction X, and a pair of second wall parts 33 extending toward the lower side (−Z) in the vertical direction Z from both ends in the horizontal direction X of the first wall part 32.

In the present embodiment, the first wall part 32 is provided with a pair of pin holes 32*a* in which a pair of pins 22P disposed on the obverse surface 22*b* of the second frame 22 are inserted. It should be noted that by forming one of the pair of pin holes 32*a* with an elongate hole, it is possible to improve the workability when performing the positioning between the frame reinforcement member 30 and the second frame 22 irrespective of a variation in dimension between the pair of pins 22P.

The second magnet holders 35 are each a region which rises toward the back side (−Y) in the front-back direction Y from end portions 33*a* of the second wall part 33 out of the second surface 31*b* of the main body part 31, and which extends in the vertical direction Z.

In the case of the present embodiment, a part of each of the second magnet holders 35 protrudes toward the lower side (−Z) in the vertical direction Z with respect to the second wall part 33. In other words, the length in the front-back direction Y of the second magnet holders 35 is longer than the length in the front-back direction Y of the second wall parts 33.

Therefore, it is possible for the second magnet holders 35 of the frame reinforcement member 30 to be able to hold a larger magnet.

The second magnet holders 35 each have a support plate 35*a* for supporting the magnet, and a locking stopper 35*b* for locking the magnet supported by the support plate 35*a*, and is capable of stably holding the magnet.

In the case of the present embodiment, by disposing the second magnet holders 35 as the uprise wall parts, it is possible to increase the strength without growing the frame reinforcement member 30 in size. Further, by using the uprise wall parts as the magnet holders, it is possible to prevent the frame reinforcement member from growing in size.

The base coupling part 34 includes a base fixation part 34*a* and the second coupling shaft part 34*b*.

The base fixation part 34*a* is a region for fixing the frame reinforcement member 30 to the secondary second frame fixation part 232 of the base 23. The secondary second frame fixation part 232 has a support surface 232*a* for supporting the base fixation part 34*a*, and a positioning pin 232*b* protruding from the support surface 232*a*.

The second coupling shaft part 34*b* is located on the second oscillation axis J2, and swingably couples the second frame 22 to the base 23 at the lower side (−Z) in the vertical direction Z.

In the case of the present embodiment, since the frame reinforcement member 30 includes the second coupling shaft part 34*b*, it is possible to achieve a reduction in number of components. Further, by forming the second coupling shaft part 34*b* with the frame reinforcement member 30, it is possible to improve the durability of the second coupling shaft part 34*b*.

In the present embodiment, the base fixation part 34*a* is provided with a cutout 34*a*1 through which the positioning pin 232*b* disposed on the support surface 232*a* of the secondary second frame fixation part 232 is inserted. By inserting the positioning pin 232*b* into the cutout 34*a*1 of the base fixation part 34*a*, the position of the frame reinforcement member 30 to the base 23 is regulated.

As described above, in the pixel shifting device 10 according to the present embodiment, it is possible to increase the rigidity of the second frame 22 by disposing the frame reinforcement member 30 in the extending part 220 in which the first actuator 25 and the second actuators 26 are intensively disposed in the second frame 22.

Thus, since the deformation of the second frame 22 oscillating around the second oscillation axis J2 is suppressed, it is possible for the pixel shifting device 10 according to the present embodiment to accurately control the posture of the optical member 20 which is held via the first frame 21.

Further, since the deformation of the second frame 22 is difficult to occur, it is possible to prevent, for example, the second frame 22 or the optical member 20 held by the second frame 22 via the first frame 21 from moving in the front-back direction Y to make contact with the image generator 4. Therefore, according to the pixel shifting device 10 related to the present embodiment, it becomes possible to dispose the pixel shifting device 10 in the state of coming closer to the image generator 4 in the front-back direction Y. Therefore, it is possible to further reduce the size in the front-back direction Y of the projector 1 according to the present embodiment. Therefore, since the pixel shifting device 10 according to the present embodiment efficiently takes in the image light LT emitted from the projection optical system 6 of the image generator 4, it is possible to increase the light use efficiency of the image light LT.

Further, since the deformation of the second frame 22 is difficult to occur, it is possible to efficiently use the drive forces of the second actuators 26 in the rotation of the second frame 22. Therefore, since a current to be supplied to the second actuators 26 for tilting the optical member 20 as much as the same angle becomes smaller, it is possible to suppress the power consumption of the second actuators 26.

Then, an operation of the pixel shifting device 10 according to the present embodiment will be described.

The pixel shifting device 10 according to the present embodiment energizes the first coil 25*b* using a circuit board not shown to thereby generate a magnetic field to repel or attract the first magnet 25*a* to thereby generate the force in a direction crossing the first oscillation axis J1 between the first magnet 25*a* and the first coil 25*b* in each of the first actuators 25. Thus, the first frame 21 oscillates around the first oscillation axis J1. In the first frame 21, since the coupling shaft parts 240 of the pair of first oscillation shaft formation parts 24 located at the both ends in the direction along the first oscillation axis J1 are coupled to the second frame 22 as described above, it is possible for the optical member 20 fixed to the first frame 21 to oscillate around the first oscillation axis J1 with respect to the second frame 22.

Further, the pixel shifting device 10 according to the present embodiment energizes the second coil 26*b* using a circuit board not shown to thereby generate a magnetic field to repel or attract the second magnet 26*a* to thereby generate the force in a direction crossing the second oscillation axis J2 between the second magnet 26*a* and the second coil 26*b* in each of the second actuators 26. Thus, the second frame 22 oscillates around the second oscillation axis J2. In the second frame 22, since the first coupling shaft part 28*b* and the second coupling shaft part 34*b* located at the both ends in the direction along the second oscillation axis J2 are coupled to the base 23 as described above, it is possible for the optical member 20 fixed to the second frame 22 via the first frame 21 and the first oscillation shaft formation parts 24 to oscillate around the second oscillation axis J2 with respect to the base 23.

In such a manner, it is possible for the pixel shifting device 10 according to the present embodiment to biaxially control the posture of the optical member 20 using the drive forces by the pair of first actuators 25 and the pair of second actuators 26. It is possible for the pixel shifting device 10 to shift the light path of the image light LT emitted from the image generator 4 in the directions along the two axes by changing the posture of the optical member 20.

In the case of the present embodiment, when the first frame 21 oscillates around the first oscillation axis J1, the incident angle of the image light LT with respect to the optical member 20 changes, and the light path of the image light LT moves in the second direction F2 (see FIG. 2). Further, when the second frame 22 for holding the first frame 21 oscillates around the second oscillation axis J2, the incident angle of the image light LT with respect to the optical member 20 changes in a different direction from when oscillating around the first oscillation axis J1, and the light path of the image light LT moves in the first direction F1 (see FIG. 2).

As described above, the pixel shifting device 10 according to the present embodiment is provided with the optical member 20, the first frame 21 which holds the optical member 20 and which oscillates around the first oscillation axis J1, the second frame 22 which is disposed on the periphery of the first frame 21, and is at the same time, coupled to the first frame 21, and which oscillates around the second oscillation axis J2 perpendicular to the first oscillation axis J1, the base 23 which is disposed on the periphery of the second frame 22, and is at the same time, coupled to the second frame 22, the pair of first oscillation shaft formation parts 24 which are disposed at both sides of the first frame 21 in the direction along the first oscillation axis J1, and couple the first frame 21 and the second frame 22 to each other, the first actuators 25 which oscillate the first frame 21 with respect to the second frame 22 between the first frame 21 and the second frame 22, and the second actuators 26 which oscillate the second frame 22 with respect to the base 23 between the second frame 22 and the base 23. The second frame 22 and the base 23 are provided with the actuator holding parts 29 which extend at the lower side (−Z) in the vertical direction Z along the second oscillation axis J2, and which holds the second actuators 26, and the pair of first oscillation shaft formation parts 24 have the pair of coupling shaft parts 240 which are located on the first oscillation axis J1, and which couple the first frame 21 and the second frame 22 to each other, and the pair of beams 241 extending respectively from the pair of coupling shaft parts 240 on the obverse surface 22*b* of the second frame 22 in the vertical direction Z along the second oscillation axis J2.

According to the pixel shifting device 10 related to the present embodiment, since the pair of beams 241 of the pair of first oscillation shaft formation parts 24 for coupling the first frame 21 and the second frame 22 to each other are formed along the obverse surface 22*b* of the second frame 22, it is possible to increase the strength of the second frame 22. Therefore, in the pixel shifting device 10 according to the present embodiment, by increasing the strength of the coupling portion in the second frame 22 to the first frame 21 using the pair of first oscillation shaft formation parts 24, it is possible to prevent a deformation and a breakage of the second frame 22 even when, for example, a load caused by a vibration in transportation or a load caused by an impact due to a drop is applied.

Therefore, even when adopting what is constituted by a large-sized and lightweight member as the second frame 22 by increasing the size of the optical member 20 of the pixel shifting device 10, it is possible to provide a resistance to a load caused by an impact by increasing the strength of the second frame 22. Therefore, according to the pixel shifting device 10 related to the present embodiment, even when adopting a structure in which the first actuator 25 and the second actuators 26 are intensively disposed at one side of the second frame 22 light in weight and large in size, it is possible to provide a device in which the second frame 22 is provided with the resistance to a load caused by an impact, and which is high in reliability.

Further, in the pixel shifting device 10 according to the present embodiment, the first actuator 25 and the second actuators 26 are intensively disposed at one side of the second frame 22 with respect to the first oscillation axis J1, and it becomes easy for the stress generated due to the drive forces of the first actuator 25 and the second actuators 26 to be concentrated in the second frame 22. To cope with the above, since the deformation of the second frame 22 is suppressed by increasing the rigidity using the frame reinforcement member 30, it is possible for the pixel shifting device 10 according to the present embodiment to accurately control the posture of the optical member 20 which is held via the first frame 21.

Further, since the deformation of the second frame 22 is difficult to occur, it is possible to prevent, for example, the second frame 22 or the optical member 20 held by the second frame 22 via the first frame 21 from moving in the front-back direction Y to make contact with the image generator 4. Therefore, according to the pixel shifting device 10 related to the present embodiment, it is possible to dispose the pixel shifting device 10 in the state of coming closer to the image generator 4 in the front-back direction Y. Therefore, it is possible to reduce the size in the front-back direction Y of the projector 1 according to the present embodiment.

Further, in the pixel shifting device 10 according to the present embodiment, by the frame reinforcement member 30 increasing the rigidity, an amount of distortion caused by the stress of the second frame 22 is reduced, and it is possible to prevent the vibration of the second actuators 26 from attenuating to efficiently oscillate the second frame 22. Therefore, it is possible to efficiently use the drive forces of the second actuators 26 for the rotation of the second frame 22, and therefore, it is possible to drive the second actuators 26 in an energy-saving manner.

Further, according to the projector 1 related to the present embodiment, since the pixel shifting device 10 described above is provided, the projector 1 becomes excellent in resistance to the load caused by a vibration in transportation or by an impact due to a drop. Further, since it is possible to adopt one large in size as the optical member 20 in the pixel shifting device 10, it is possible to use the large-sized panels as the liquid crystal panels 4RP, 4GP, and 4BP, and thus, it is possible to project a bright image on the screen SCR.

Further, since the projector 1 according to the present embodiment is provided with the pixel shifting device 10 capable of driving the second frame 22 in an energy-saving manner, it is possible to keep the power consumption of the projector low.

It should be noted that the scope of the present disclosure is not limited to the embodiment described above, and a variety of modifications can be provided thereto within the scope or the spirit of the present disclosure.

Besides the above, the specific configurations of the number, the arrangement, the shape, the material, and so on of each of the constituents constituting the light source device are not limited to those of the embodiments described above, but can arbitrarily be modified.

There is cited when the pixel shifting device 10 according to the present embodiment is provided with the pair of first actuators 25 and the pair of second actuators 26 as an example, but it is possible to adopt a configuration provided with a single first actuator 25 and a single second actuator 26.

First Modified Example

Figure 7:
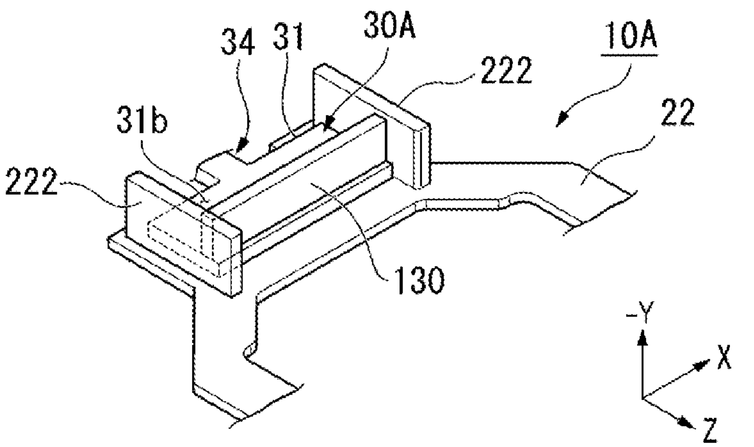
FIG. 7 is a enlarged view showing a configuration of an essential part of a pixel shifting device according to a first modified example.

FIG. 7 is an enlarged view showing a configuration of an essential part of a pixel shifting device according to a modified example. It should be noted that in the present modified example, constituents common to the embodiment described above will be denoted by the same reference symbols, and the detailed description thereof will be omitted.

For example, in the pixel shifting device 10 according to the present embodiment, the frame reinforcement member 30 is provided with the second magnet holders 35, but the magnet holder can be formed of a part of the second frame 22 instead of being formed integrally with the frame reinforcement member.

FIG. 7 is an enlarged view showing a configuration of an essential part of the pixel shifting device according to the first modified example.

As shown in FIG. 7, in the pixel shifting device 10A according to the present modified example, a second magnet holder 222 for holding the second magnet of the second actuator 26 is separated from the frame reinforcement member 30A, and is formed integrally with the second frame 22.

The frame reinforcement member 30A is provided with a rib 130 which extends in a direction crossing the pair of second magnet holders 222 disposed in the second frame 22, and is disposed between the pair of second magnet holders 222. The rib 130 is a region which rises at the back side (−Y) in the front-back direction Y from a second surface 31*b* of the main body part 31, and which extends in the horizontal direction X.

It is possible for the rib 130 of the frame reinforcement member 30A to prevent a deformation of the pair of second magnet holders 222 of the second frame 22 coming closer to each other in the horizontal direction X. In other words, since the frame reinforcement member 30A related to the present modified example is provided with the rib 130, it is possible for the frame reinforcement member 30A related to the present modified example to increase the rigidity of the second frame 22 having the second magnet holders 222.

Further, it is also possible to dispose a rib extending in a direction crossing the pair of second magnet holders 35 provided to the frame reinforcement member 30 of the pixel shifting device 10 according to the embodiment described above. Thus, by further increasing the rigidity of the frame reinforcement member 30, it is possible to prevent a deformation of the pair of second magnet holders 35 coming closer to each other in the horizontal direction X.

Further, to the frame reinforcement member 30 in the embodiment described above, there is integrally disposed the base coupling part 34 including the second coupling shaft part 34*b*. In other words, there is adopted the configuration in which the frame reinforcement member 30 in the present embodiment is formed integrally with the base coupling part for coupling the second frame 22 and the base 23 to each other, but it is possible to adopt a configuration in which the frame reinforcement member is separated from the coupling shaft part.

Second Modified Example

Figure 8:
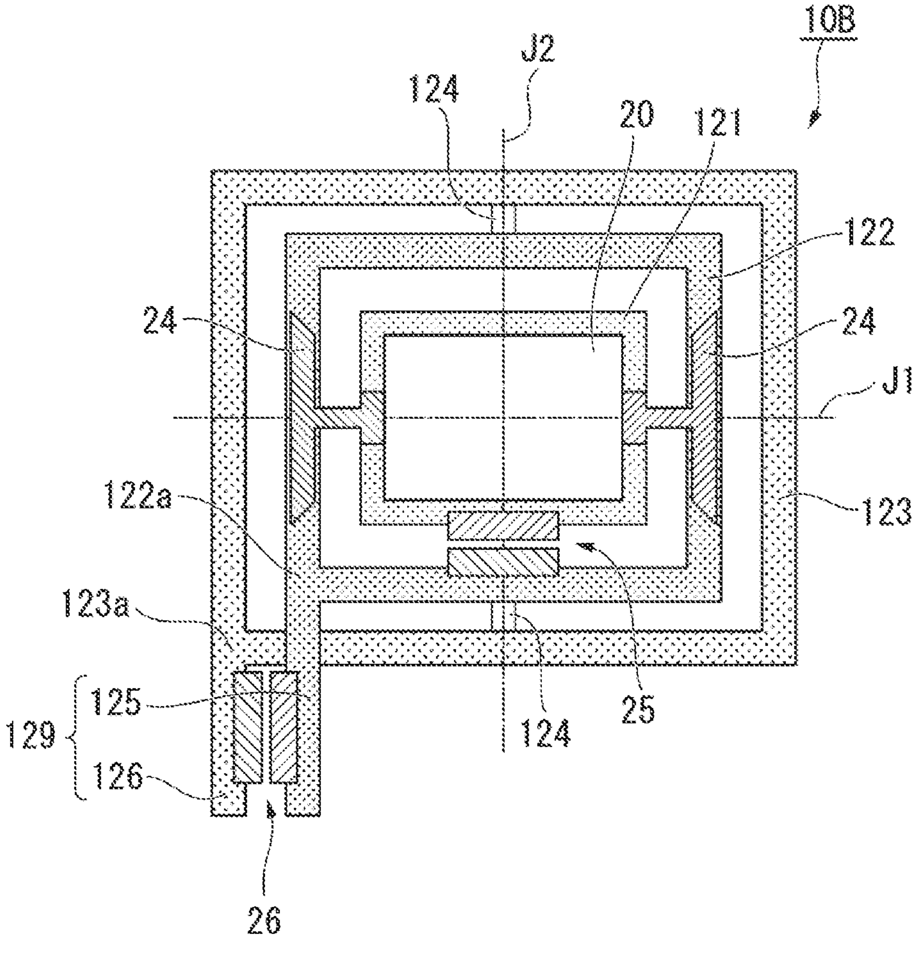
FIG. 8 is a plan view showing a schematic configuration of a pixel shifting device according to a second modified example.

FIG. 8 is a plan view showing a schematic configuration of a pixel shifting device according to a modified example. It should be noted that in the present modified example, constituents common to the embodiment described above will be denoted by the same reference symbols, and the detailed description thereof will be omitted.

As shown in FIG. 8, the pixel shifting device 10B according to the present modified example is provided with the optical member 20, a first frame 121, a second frame 122, a base 123, the pair of first oscillation shaft formation parts 24, a single first actuator 25, and a single second actuator 26.

In the present modified example, the first actuator 25 is disposed in a gap at a lower side (−Z) out of the gap between the first frame 121 and the second frame 122 on the second oscillation axis J2.

The second frame 122 is disposed on the periphery of the first frame 121, and at the same time, coupled to the first frame 121 via a pair of coupling shafts 124 disposed on the second oscillation axis J2.

The second actuator 26 is held by an actuator holding part 129 disposed in a portion extending from a left side (−X) and a lower side (−Z) of the second frame 122 and the base 123. The actuator holding part 129 in the present modified example is constituted by a magnet holder 125 extending from the lower left end portion 122*a* of the second frame 122 toward the lower side (−Z), and a coil holder 126 extending from a lower left end portion 123*a* of the base 123 toward the lower side (−Z). In the present modified example, the second frame 122 and the base 123 are disposed so that the positions in the front-back direction Y are shifted from each other. Therefore, the magnet holder 125 of the second frame 122 extends toward the lower end (−Z) straddling the base 123, and therefore, does not interfere with the base 123.

The pixel shifting device 10B according to the present modified example has a structure in which the first actuator 25 and the second actuator 26 are intensively disposed at the lower side (−Z) in the vertical direction Z along the second oscillation axis J2 with respect to the optical member 20. Also in the pixel shifting device 10B according to the present modified example, it is possible to increase the rigidity of the second frame 122 formed of a large-sized and lightweight material with the pair of first oscillation shaft formation parts 24.

Therefore, since the rigidity of the second frame 122 is increased also in the pixel shifting device 10B according to the present modified example, it is possible to improve the resistance to a load caused by an impact such as a drop. Thus, even when increasing the size of the pixel shifting device 10B to adopt the second frame 122 light in weight and large in size, it is possible to provide a pixel shifting device in which a deformation and a breakage due to a load caused by an impact such as a drop are prevented, and which is high in reliability.

Hereinafter, the conclusion of the present disclosure will supplementarily be noted.

Supplementary Note 1

A pixel shifting device including an optical member, a first frame which is configured to hold the optical member, and which oscillates around a first oscillation axis, a second frame which is disposed on a periphery of the first frame, which is coupled to the first frame, and which oscillates around a second oscillation axis perpendicular to the first oscillation axis, a base which is disposed on a periphery of the second frame, and which is coupled to the second frame, a pair of first oscillation shaft formation parts which are disposed at both sides of the first frame in a direction along the first oscillation axis, and which are configured to couple the first frame and the second frame to each other, a first actuator configured to oscillate the first frame with respect to the second frame between the first frame and the second frame, and a second actuator configured to oscillate the second frame with respect to the base between the second frame and the base, wherein the second frame and the base are provided with an actuator holding part which extends toward one side in an axial direction along the second oscillation axis, and which is configured to hold the second actuator, and the pair of first oscillation shaft formation parts have a pair of coupling shafts which are located on the first oscillation axis, and which are configured to couple the first frame and the second frame to each other, and a pair of beams which extend on a surface of the second frame respectively from the pair of coupling shafts in a direction along the second oscillation axis.

According to the pixel shifting device having this configuration, since the pair of beams of the pair of first oscillation shaft formation parts for coupling the first frame and the second frame to each other are formed along the surface of the second frame, it is possible to increase the strength of the second frame. In this pixel shifting device, by increasing the strength of the coupling portion in the second frame to the first frame using the pair of first oscillation shaft formation parts, it is possible to prevent a deformation and a breakage of the second frame even when, for example, a load caused by a vibration in transportation or a load caused by an impact due to a drop is applied. Therefore, it is possible to provide the pixel shifting device in which the resistance to a load caused by an impact is improved, and which is high in reliability.

Further, even when adopting what is constituted by a large-sized and lightweight member as the second frame by increasing the size of the optical member of the pixel shifting device, it is possible to provide a resistance to a load caused by an impact by increasing the strength of the second frame.

Therefore, according to this pixel shifting device, even when adopting a structure in which the first actuator and the second actuator are intensively disposed at one side of the second frame light in weight and large in size, it is possible to provide a device in which the resistance to a load caused by an impact in the second frame is provided, and which is high in reliability.

Supplementary Note 2

The pixel shifting device described in Supplementary Note 1, wherein the second frame and the base are provided with a pair of the actuator holding parts, and the second actuator is constituted by a pair of actuators respectively disposed in the pair of actuator holding parts.

According to this configuration, it is possible to accurately shift the light path of the image light by stably ensuring oscillation forces around the second oscillation axis using the pair of second actuators to thereby stabilize a change in posture of the optical member.

Supplementary Note 3

The pixel shifting device described in Supplementary Note 2, wherein the pair of first oscillation shaft formation parts are symmetrically disposed centering on the second oscillation axis.

According to this configuration, since the first frame and the second frame are coupled to each other in a balanced manner with the pair of first oscillation shaft formation parts, it is possible to oscillate the optical member in a stable state around the first oscillation axis.

Supplementary Note 4

The pixel shifting device described in Supplementary Note 3, wherein each of the pair of beams is disposed to straddle the first oscillation axis.

According to this configuration, since each of the beams is disposed at both sides of the first oscillation axis, it is possible to increase the strength of the portion in a balanced manner, the portion extending in a direction perpendicular to the first oscillation axis out of the second frame.

Supplementary Note 5

The pixel shifting device described in Supplementary Note 4, wherein a length in a direction along the second oscillation axis in each of the pair of beams is a length corresponding to a length in the direction along the second oscillation axis of the first frame.

According to this configuration, since the pair of beams having the length corresponding to the first frame are disposed to overlap the second frame, it is possible to sufficiently increase the rigidity of the second frame. Therefore, even when using the second frame formed of a lightweight material small in thickness, it is possible to ensure the sufficient rigidity as the second frame, and therefore, it is possible to realize a reduction in size and a reduction in weight of the device itself.

Supplementary Note 6

The pixel shifting device described in Supplementary Note 4, wherein each of the pair of beams is symmetrically disposed centering on the first oscillation axis.

According to this configuration, since each of the beams is symmetrically disposed at both sides of the first oscillation axis, it is possible to evenly increase the strength of the portion extending in a direction perpendicular to the first oscillation axis out of the second frame.

Supplementary Note 7

The pixel shifting device described in any one of Supplementary Note 1 through Supplementary Note 6, wherein the pair of beams have an uprise wall part which rises along a normal direction of the surface of the second frame, and which extends in a direction along the second oscillation axis.

According to this configuration, by providing the uprise wall part, it is possible to increase the second moment of area of the second frame. Therefore, it is possible for the pair of beams to increase the rigidity of the second frame while keeping the length in a direction along the second oscillation axis at a minimum. Therefore, according to this configuration, it is possible to efficiently increase the rigidity of the second frame while suppressing an increase in weight by suppressing the length of the pair of beams.

Supplementary Note 8

The pixel shifting device described in Supplementary Note 7, wherein the uprise wall part is disposed in an end portion at the base side in each of the pair of beams, and in a plan view in a normal direction of the surface of the second frame, both end portions in the direction along the second oscillation axis in each of the pair of beams have oblique sides with which the length in the direction along the second oscillation axis increases in a direction from the first frame side toward the base side.

According to this configuration, it is possible to achieve a reduction in weight while ensuring the rigidity of each of the beams by disposing the oblique sides in the both end portions of each of the beams.

Supplementary Note 9

The pixel shifting device described in any one of Supplementary Note 1 through Supplementary Note 8, wherein the first actuator is disposed on the second oscillation axis, and the actuator holding part is located at an opposite side to the first oscillation axis with respect to the first actuator.

The deformation becomes apt to occur in the second frame extending in the direction along the second oscillation axis. To cope with the above, according to the pixel shifting device in the present configuration, since the strength of the second frame is increased by the pair of first oscillation shaft formation parts, the deformation can be prevented even in the shape extending along the second oscillation axis.

Supplementary Note 10

A projector including an image generator configured to generate image light, a projection optical system configured to project the image light, and the pixel shifting device described in any one of Supplementary Note 1 through Supplementary Note 9 which is disposed between the image generator and the projection optical system, and which is configured to shift a light path of the image light from the image generator.

According to the projector having this configuration, since the pixel shifting device is provided, the projector becomes excellent in resistance to a load caused by a vibration in transportation or by an impact due to a drop.

Further, by adopting one large in size as the optical member in the pixel shifting device, it is possible to use the large-sized panels as, for example, the liquid crystal panels in the image generator, and thus, it is possible to project a bright image.

Supplementary Note 11

The projector described in Supplementary Note 10, wherein the image generator includes a first light modulation device which has a first light exit surface, and which is disposed so that the first light exit surface faces toward the projection optical system, a second light modulation device which has a second light exit surface, and which is disposed so that the second light exit surface faces to a direction perpendicular to a direction in which the first light modulation device and the projection optical system are disposed side by side, a third light modulation device which has a third light exit surface, and which is disposed so that the third light exit surface is opposed to the second light exit surface of the second light modulation device, and a light combining element which is configured to combine light beams respectively emitted from the first light modulation device, the second light modulation device, and the third light modulation device with each other to generate the image light, and then emits the image light toward the projection optical system, the optical member of the pixel shifting device is disposed on the light path of the image light between the projection optical system and the light combining element, and end portions at the projection optical system side of the second light modulation device and the third light modulation device each overlap the pixel shifting device in a direction in which the first light modulation device and the projection optical system are disposed side by side.

According to this configuration, since the pair of beams of the first oscillation shaft formation parts of the pixel shifting device are provided, it is not necessary to increase the thickness of the second frame with the aim of an increase in strength when growing in size.

Therefore, since the thickness of the second frame becomes thin, it is possible to achieve a further reduction in size of the device configuration by arranging the second light modulation device and the third light modulation device closer to the pixel shifting device.

What is claimed is:

1. A pixel shifting device comprising:

an optical member;

a first frame which is configured to hold the optical member, and which oscillates around a first oscillation axis;

a second frame which is disposed on a periphery of the first frame, which is coupled to the first frame, and which oscillates around a second oscillation axis perpendicular to the first oscillation axis;

a base which is disposed on a periphery of the second frame, and which is coupled to the second frame;

a pair of first oscillation shaft formation parts which are disposed at both sides of the first frame in a direction along the first oscillation axis, and which are configured to couple the first frame and the second frame to each other;

a first actuator configured to oscillate the first frame with respect to the second frame between the first frame and the second frame; and a second actuator configured to oscillate the second frame with respect to the base between the second frame and the base, wherein the second frame and the base are provided with an actuator holding part which extends toward one side in an axial direction along the second oscillation axis, and which is configured to hold the second actuator, and the pair of first oscillation shaft formation parts have a pair of coupling shafts which are located on the first oscillation axis, and which are configured to couple the first frame and the second frame to each other, and a pair of beams which extend on a surface of the second frame respectively from the pair of coupling shafts in a direction along the second oscillation axis, wherein an uprise wall part is disposed in an end portion at the base side in each of the pair of beams, and the pair of beams and the uprise wall part together form a substantially L-shaped cross-section along an X-Y plane to increase a second moment of area of the pair of beams.

2. The pixel shifting device according to claim 1, wherein the second frame and the base are provided with a pair of the actuator holding parts, and the second actuator is constituted by a pair of actuators respectively disposed in the pair of actuator holding parts.

3. The pixel shifting device according to claim 2, wherein the pair of first oscillation shaft formation parts are symmetrically disposed centering on the second oscillation axis.

4. The pixel shifting device according to claim 3, wherein each of the pair of beams is disposed to straddle the first oscillation axis.

5. The pixel shifting device according to claim 4, wherein a length in a direction along the second oscillation axis in each of the pair of beams is a length corresponding to a length in the direction along the second oscillation axis of the first frame.

6. The pixel shifting device according to claim 4, wherein each of the pair of beams is symmetrically disposed centering on the first oscillation axis.

7. The pixel shifting device according to claim 1, wherein the uprise wall part is disposed in an end portion at the base side in each of the pair of beams, and in a plan view in a normal direction of the surface of the second frame, both end portions in the direction along the second oscillation axis in each of the pair of beams have oblique sides with which the length in the direction along the second oscillation axis increases in a direction from the first frame side toward the base side.

8. The pixel shifting device according to claim 1, wherein the first actuator is disposed on the second oscillation axis, and the actuator holding part is located at an opposite side to the first oscillation axis with respect to the first actuator.

9. The pixel shifting device according to claim 1, wherein the first frame is formed of stainless steel, the second frame is formed of aluminum, and the base is formed of aluminum.

10. A projector comprising:

an image generator configured to generate image light;

a projection optical system configured to project the image light; and the pixel shifting device according to claim 1 which is disposed between the image generator and the projection optical system, and which is configured to shift a light path of the image light from the image generator.

11. The projector according to claim 10, wherein the image generator includes a first light modulation device which has a first light exit surface, and which is disposed so that the first light exit surface faces toward the projection optical system, a second light modulation device which has a second light exit surface, and which is disposed so that the second light exit surface faces to a direction perpendicular to a direction in which the first light modulation device and the projection optical system are disposed side by side, a third light modulation device which has a third light exit surface, and which is disposed so that the third light exit surface is opposed to the second light exit surface of the second light modulation device, and a light combining element which is configured to combine light beams respectively emitted from the first light modulation device, the second light modulation device, and the third light modulation device with each other to generate the image light, and then emits the image light toward the projection optical system, the optical member of the pixel shifting device is disposed on the light path of the image light between the projection optical system and the light combining element, and end portions at the projection optical system side of the second light modulation device and the third light modulation device each overlap the pixel shifting device in a direction in which the first light modulation device and the projection optical system are disposed side by side.

12. A pixel shifting device comprising:

an optical member;

a first frame which is configured to hold the optical member, and which oscillates around a first oscillation axis;

a second frame which is disposed on a periphery of the first frame, which is coupled to the first frame, and which oscillates around a second oscillation axis perpendicular to the first oscillation axis;

a base which is disposed on a periphery of the second frame, and which is coupled to the second frame;

a pair of first oscillation shaft formation parts which are disposed at both sides of the first frame in a direction along the first oscillation axis, and which are configured to couple the first frame and the second frame to each other;

a first actuator configured to oscillate the first frame with respect to the second frame between the first frame and the second frame; and a second actuator configured to oscillate the second frame with respect to the base between the second frame and the base, wherein the second frame and the base are provided with an actuator holding part which extends toward one side in an axial direction along the second oscillation axis, and which is configured to hold the second actuator, and the pair of first oscillation shaft formation parts have a pair of coupling shafts which are located on the first oscillation axis, and which are configured to couple the first frame and the second frame to each other, and a pair of beams which extend on a surface of the second frame respectively from the pair of coupling shafts in a direction along the second oscillation axis, wherein the pair of beams have an uprise wall part which rises along a normal direction of the surface of the second frame, and which extends in a direction along the second oscillation axis, the uprise wall part is disposed in an end portion at the base side in each of the pair of beams, and in a plan view in a normal direction of the surface of the second frame, both end portions in the direction along the second oscillation axis in each of the pair of beams have oblique sides with which the length in the direction along the second oscillation axis increases in a direction from the first frame side toward the base side.

* * * * *